United States Patent
Spencer

(10) Patent No.: US 7,855,031 B2
(45) Date of Patent: Dec. 21, 2010

(54) METHOD OF MAKING BIPOLAR PLATE WITH COOLANT CHANNELS

(75) Inventor: Steven J. Spencer, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 982 days.

(21) Appl. No.: 11/674,179

(22) Filed: Feb. 13, 2007

(65) Prior Publication Data

US 2007/0200277 A1    Aug. 30, 2007

Related U.S. Application Data

(60) Provisional application No. 60/776,500, filed on Feb. 24, 2006.

(51) Int. Cl.
*H01M 8/04* (2006.01)

(52) U.S. Cl. .................. 429/512; 429/456; 429/535

(58) Field of Classification Search .................. None
See application file for complete search history.

(56) References Cited

U.S. PATENT DOCUMENTS

| | | | | |
|---|---|---|---|---|
| 6,218,038 | B1 * | 4/2001 | Oko et al. | 429/434 |
| 7,601,451 | B2 * | 10/2009 | Tighe | 429/443 |
| 2004/0209150 | A1 | 10/2004 | Rock | |

* cited by examiner

*Primary Examiner*—Keith Walker
(74) *Attorney, Agent, or Firm*—Reising Ethington P.C.

(57) ABSTRACT

Bipolar plates in a fuel cell stack tend to experience lower operating temperatures near and at the ends of the stack, and these plates require lower coolant flow. But common stamping tooling can be used to make all of the plates for the stack when suitable coolant flow restrictors are stamped into each plate for lowest coolant flow. The flow restrictors are then trimmed (or their formation avoided) from those plates designated for higher coolant flow.

9 Claims, 5 Drawing Sheets

METHOD OF MAKING BIPOLAR PLATE WITH COOLANT CHANNELS

This application claims priority based on provisional application 60/776,500, titled "Unipolar Fuel Cell Plate Design," filed Feb. 24, 2006 and which is incorporated herein by reference.

TECHNICAL FIELD

This invention pertains to the design of bipolar plates for fuel cells and to methods of manufacturing such plates. More specifically, this invention pertains to design features of such plates affecting the flow of coolant through and between them in different regions of a fuel cell stack.

BACKGROUND OF THE INVENTION

United States Patent Application Publication 2004/0209150, dated Oct. 21, 2004, and titled "Stamped Fuel Cell Bipolar Plate" describes an assembly of structural and functional elements used in a gaseous fuel (e.g., hydrogen)/gaseous oxidant (air) fuel cell. The elements for many electrochemical cells are stacked to form a multi-cell assembly for producing electrical power at specified electrical current and potential (voltage).

The interior cells of the stacked assembly comprise one side of each of two opposing bipolar plates. The facing bipolar plates enclose cell elements comprising a proton exchange membrane-electrode assembly, gaskets, gas diffusion media, and the like. Each bipolar plate is formed of two like-shaped plates, in face-to-face arrangement, that have gas flow passages on their external faces and internal coolant passages defined by their inverse and facing sides. One side of a first bipolar plate provides passages for the flow of hydrogen to the anode side of the membrane-electrode assembly and one side of a second, opposing bipolar plate provides passages for the flow of air to the cathode side of the membrane-electrode assembly. Heat is produced in the operation of the stack of cells and coolant flow through the interior of the bipolar plates is used to cool the stack, particularly the internal cells of the stack.

The plates are typically stamped from a thin, generally rectangular sheet of metal and, preferably, each sheet is of generally the same shape. Opposing edges at the short sides of each rectangular sheet are shaped, respectively, for the inlet and exit of fuel, oxidant, and coolant. The central portion of each sheet is shaped with spreading channels for gas flow from the inlet, channels for distributed flow of gas over the membrane, and converging channels for directing gas to the exit. When two such sheets are suitably bonded with gas flow passages facing outwardly to form a bipolar plate, the inverse sides of the stamped sheets provide flow-controlling passages for the coolant.

In the assembly of a fuel cell stack each bipolar plate is intended to form a part of two adjacent cells, one cell on each outer face of the bipolar plate. One outer face of a bipolar plate provides an anode plate for one cell and the other outer face provides a cathode plate for the adjacent cell. However, the bipolar plates at the ends of the stack have no cells on their outer plate surfaces. Accordingly, these plates are sometimes called unipolar plates. Although unipolar plates have the same structure as bipolar plates, they may not require the coolant flow rate permitted by the bipolar plate structure. And the bipolar plates toward the end of the stack may not require high coolant flow rates either.

When possible, it is preferred to use a single set of stamping tools for forming each of the metal sheets used in pairs in making bipolar plates. However, this means that the coolant flow in each bipolar plate may be the same regardless of its ultimate position in a stack of plates. It is desirable to have a way of altering coolant flow in selected bipolar (or unipolar) plates without requiring additional stamping tools.

SUMMARY OF THE INVENTION

The thin metal anode and cathode plates that are joined to form bipolar plates contain stamped features for the inlet, cross flow, and exhaust of fuel or oxidant, and coolant. Stamped header portions in the anode and cathode plates provide for admission and removal of these streams, and the flow of these streams within each cell is defined by an assembly of bipolar plates. This invention is directed to stamped features in the plates that affect the flow of coolant.

At present each sheet is stamped with raised surface features that are used to restrict or direct coolant flow defined between facing surfaces of the two sheets of a bipolar plate. These coolant-flow control features are designed to provide for suitable coolant flow in the interior portions of the stack of cells. However, these stamped flow control features may permit too high a coolant flow rate in end portions of the stack which do not experience or retain as much process-generated heat. The heat generation per plate is lower in the end portions as the last plate would have the full coolant flow but only half the heat generated with a membrane electrode assembly only on one side. It is desirable to have additional coolant-flow restrictions which can be located in the coolant header portions of bipolar or unipolar plates that are situated in inherently lower heat generation or retention regions of a fuel cell stack.

In accordance with this invention, stamping tooling is provided for forming coolant flow rate restrictions in bipolar plate sheets for the lowest anticipated operating temperature regions of a specified stack of cells. This simplifies stamping tool requirements. Then, in sheets for plates requiring higher cooling rates (and higher coolant flow rates) the stamped restrictions are separately removed after stamping. This means that most of the stamped sheets will have the additional coolant-flow restrictors removed because in a typical fuel cell stack most of the bipolar plates are in a higher heat generation region (ideally all cells will have the same temperature, so the coolant flow is tailored to match the heat generation and heat loss per plate). This does not require an extra processing step as the header opening must be cut from all the plates anyway, so the trimming operation for the header of these cells will also remove unneeded additional coolant-flow restrictors.

In an alternative embodiment of the invention for making the bipolar plates, regions of the starting sheet metal may be pierced or cutout where the additional flow restrictors would otherwise be formed by the stamping tooling.

Other objects and advantages of the invention will be apparent from the following more detailed descriptions of preferred embodiments.

DESCRIPTION OF PREFERRED EMBODIMENTS

United States Patent Application Publication No. US 2004/0209150 describes improvements in stamped fuel cell bipolar plate constructions. That invention is assigned to the assignee of this invention and the disclosure of that publication is incorporated in this application by reference for the purpose of its description of the elements of a fuel cell stack and for the manner of construction of the bipolar plates. The practice of this invention will be illustrated by reference to stamped bipolar plate constructions shown in the published application. But the practice of the invention is not limited to the illustrated plate design and construction.

Figure 1:
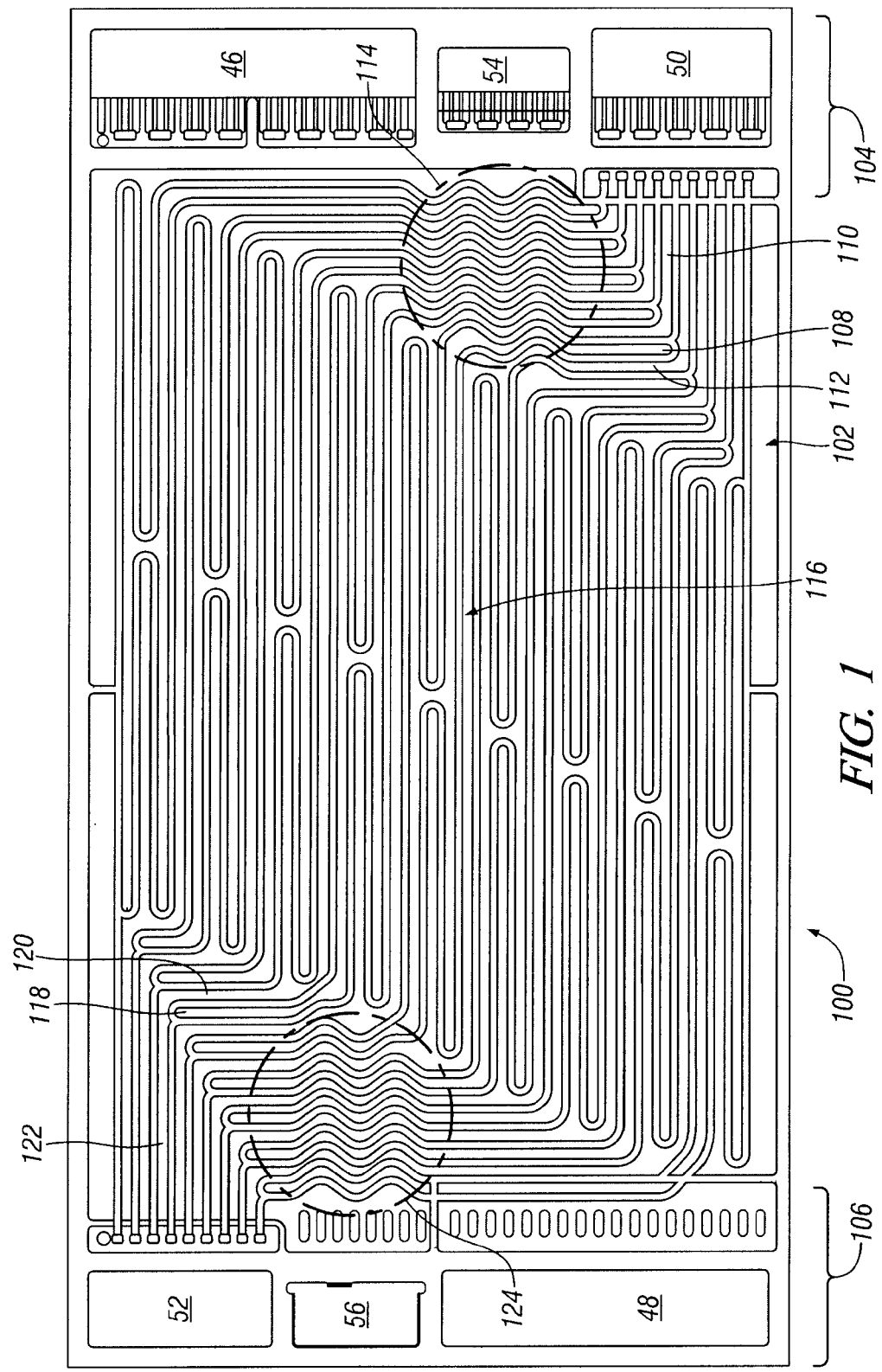
FIG. 1 is a plan view of the flow field formed in the major face of an anode plate in a bipolar plate assembly.

FIG. 1 is a plan view of an anode plate 100 which is bonded to a cathode plate (200 in FIG. 2) in making a bipolar plate for a fuel cell. Anode plate 100 has a flow field 102 for a gaseous fuel, such as hydrogen. The anode plate is formed by a stamping operation on a thin sheet of aluminum, stainless steel, or other suitable metal, and the individual anode plate 100 is trimmed from a stamped sheet. The inverse side of the anode flow field provides elements for the directing the flow of coolant through the interior of the bipolar plate.

This invention is concerned with header portions of the stamped plates. In FIG. 1, inlet margin 104 of anode plate 100 has a pair of lateral inlet headers 46 and 50 that are formed by trimming that area of the stamped plate 100. The overlying headers 46, 50 of a plurality of stacked bipolar plates provide separate manifold passages in the stack for the flow of gaseous fuel and air, respectively, to each bipolar plate. Anode plate 100 also has a medial inlet header 54 for receiving and admitting coolant into the bipolar plate.

Similarly, the exhaust margin 106 of anode plate 100 has a pair of lateral exhaust headers 48, 52 for transporting anode effluent and cathode effluent, respectively, through the fuel cell stack, and a medial exhaust header 56 for transporting coolant through the fuel cell stack.

The anode gas enters at anode inlet header 50 and exits at anode exhaust header 52. The other stamped features of the anode plate 100 that are illustrated in FIG. 1, between the inlet and outlet header portions are anode gas flow passages that distribute the anode gas over the anode surface of a membrane electrode assembly. The directional and undulating channels (e.g., 108, 110, 112, and 114) of the anode flow field 102 near the inlet header 50 gather the anode gas and distribute it across the face of the anode flow path and direct it through channels 116 which distribute the anode gas across the face of the cells electrolyte membrane. The directional and undulating channels at the exhaust end of the anode field (118, 120, 122, and 124) gather the anode gas and direct it across the face of this anode plate to the exhaust header 52.

Figure 2:
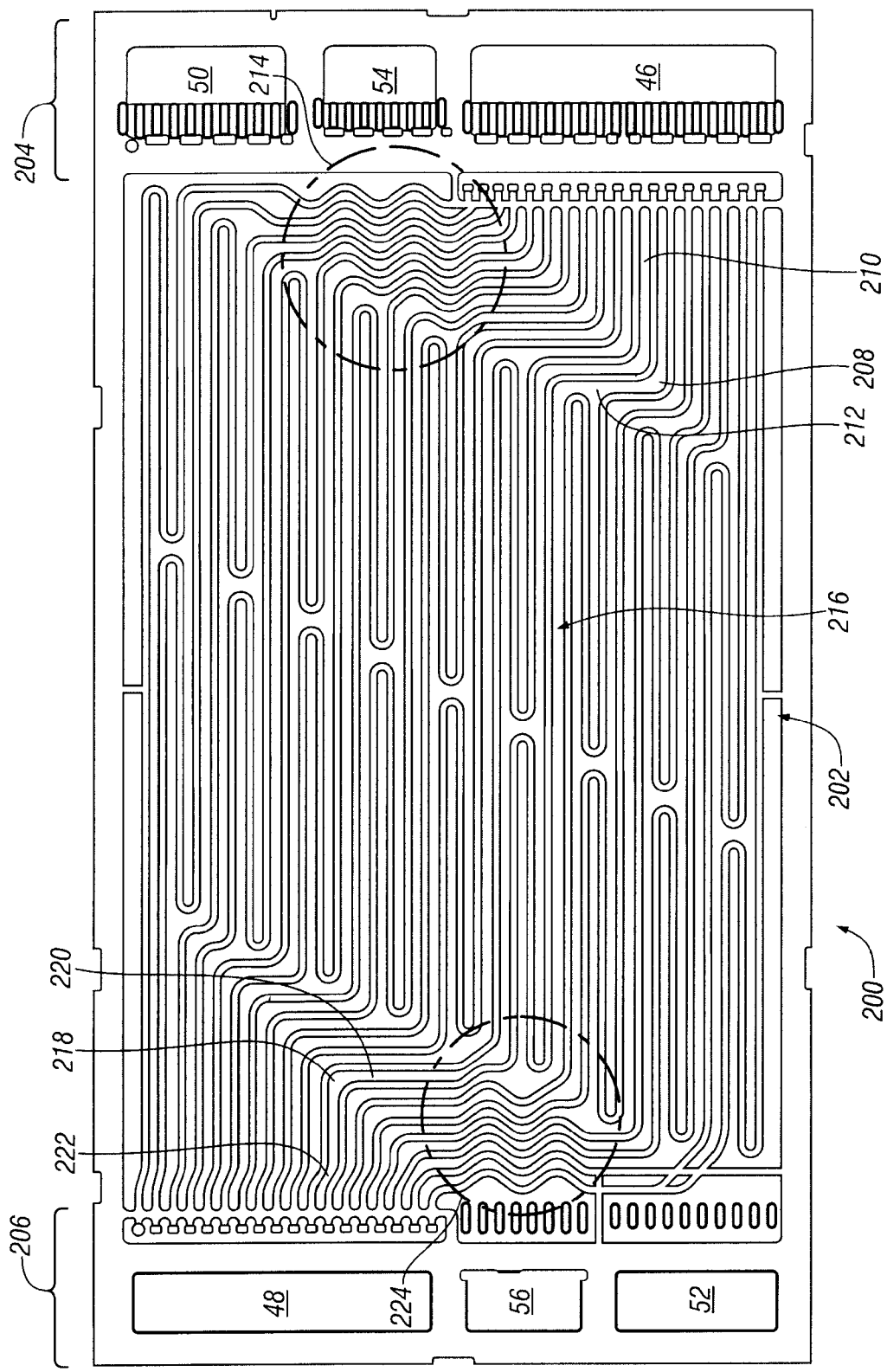
FIG. 2 is a plan view of the flow field formed in the major face of a cathode plate in a bipolar plate assembly.

FIG. 2 provides a plan view of the cathode plate 200 for a bipolar plate assembly. Cathode plate 200 shows the cathode flow field 202 stamped in the working face of the cathode plate 200. As can be seen in FIG. 2, the inlet margin 204 of cathode plate 200 (like anode plate 100) has a pair of lateral inlet headers 46 and 50 to transport cathode gas and anode gas respectively through the fuel cell stack and a medial inlet header 54 to transport a coolant through the stack. Similarly, the exhaust margin 206 has a pair of lateral exhaust headers 48, 52 for transporting anode effluent and cathode effluent respectfully through the fuel cell stack, and a medial exhaust header 56 for transporting coolant through the fuel cell stack.

Again, the flow channels in the cathode plate 200 distribute inlet cathode gas from cathode inlet header 46 into a cathode flow field 202 across the face of the plate 200 and over a membrane electrode assembly, and then re-gather the gas at the other end of cathode plate 200 and conduct it to the cathode exhaust header at 48. The directional and undulating channels (e.g., 208, 210, 212, and 214) of the cathode flow field 202 near the inlet header 46 gather the cathode gas and distribute it across the face of the cathode flow path and direct it through channels 216 which distribute the anode gas across the face of the cells electrolyte membrane. The directional and undulating channels at the exhaust end of the cathode field (218, 220, 222, and 224) gather the cathode gas and direct it across the face of this cathode plate to the exhaust header 48.

The electrochemical reactions occurring in the several cells of the stack generate heat and a coolant must be pumped through each bipolar plate to control the temperature in each cell. This invention is directed to the management of coolant flow through each bipolar plate. As stated, each bipolar plate is formed by bonding together an anode plate 100 and a cathode plate 200 so that their flow fields 102, 202 are on the outsides of the bonded plates. The shapes of the plates are complementary so that they can be oriented with their respective fuel gas, air, and coolant header portions overlying in each bipolar plate. Then, when the bipolar plates are stacked, the overlying headers form separate manifold volumes for their respective fluids. In other words, the header portions 46, 50, and 54 of anode plate 100 overlie header portions 46, 50, and 54 of cathode plate 200 in each bipolar plate, and so forth.

Figure 3:
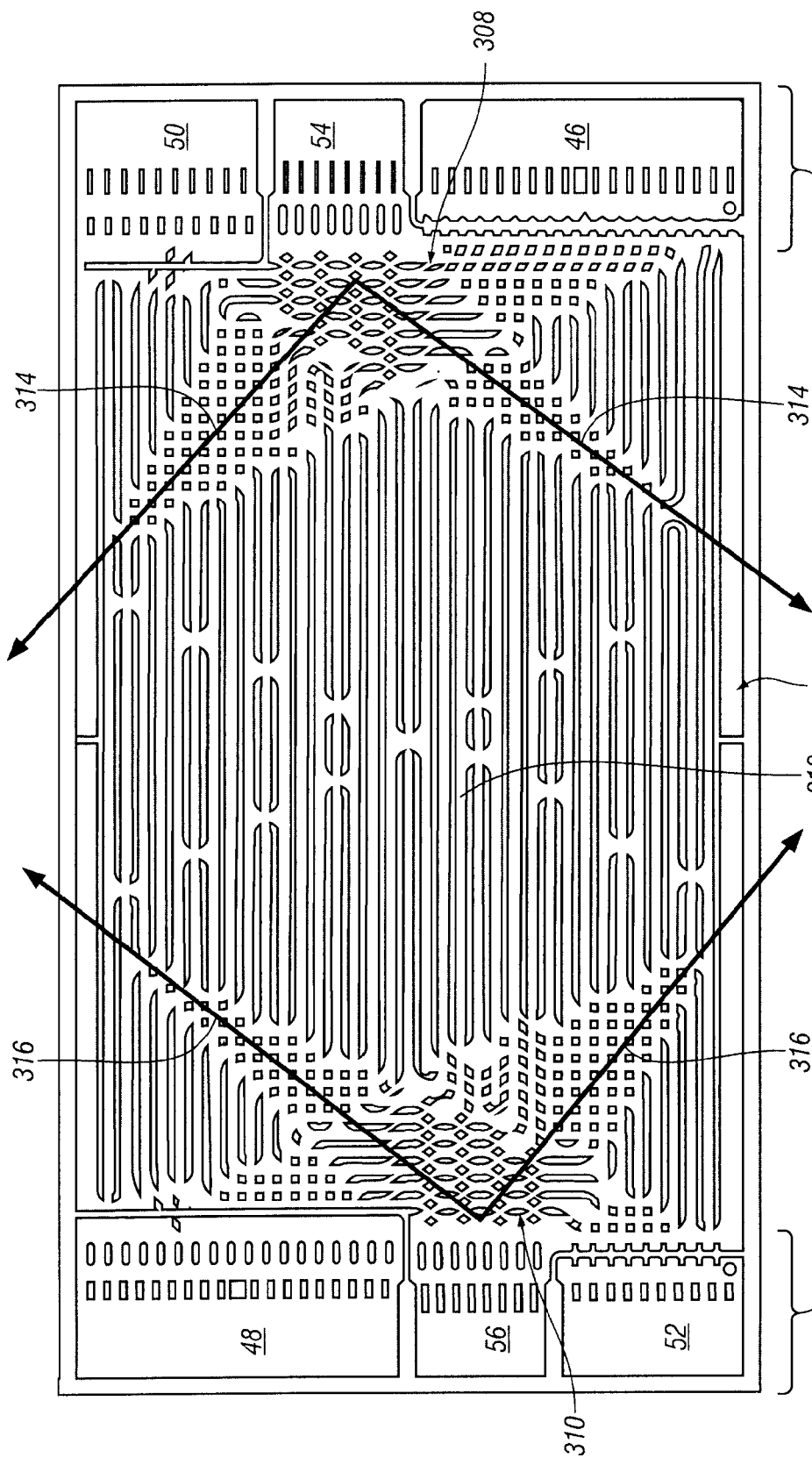
FIG. 3 is a plan view showing the contact areas at the interface between the anode plate shown in FIG. 1 and the cathode plate shown in FIG. 2.

FIG. 3 shows the coolant flow field 302 that results from the touching inverse stamped features of anode plate 100 and cathode plate 200. Coolant flow field 302 has an inlet margin 304 and an exhaust margin 306. The coolant flow field 302 also includes an array of discrete flow disrupters 308 adjacent the coolant inlet manifold 54. Coolant flow disrupters are formed at the interface of the anode inlet legs 108 (FIG. 1) and cathode inlet legs 208 (FIG. 2). Similarly, a set of flow disrupters 310 are formed adjacent the coolant exhaust header 56 at the interface of the anode exhaust legs 118 and the cathode exhaust legs 218. The coolant flow field 302 further includes a plurality of parallel flow channels 312 interposed between the inlet margin 304 and the exhaust margin 306 which are defined at the interface of the serpentine legs 116 and the serpentine legs 216.

Coolant enters from coolant inlet header 54 and is directed (as indicated by directional arrow 314) around flow disrupters 308 into the coolant flow channels 312. As coolant reaches the other side of coolant flow field 302 it flows between flow disrupters 310 in direction 316 and leaves the flow field 302 at coolant exhaust header 56. The coolant flow field 302 affects the rate of heat transfer through the anode plate 100 and cathode plate to the coolant and thus the temperature in each cell. Flow restrictors in the coolant inlet headers 54 and/or coolant outlet headers 56 also affect the flow rate of the coolant and heat transfer to it. This invention relates to the formation of supplemental flow restrictors in coolant header regions 54, 56 of the stamped plates 100, 200 to permit variation in coolant flow in different bipolar and unipolar plates of the fuel cell stack.

Some flow restrictions (un-numbered) are illustrated in regions 54 and 56 of the coolant flow field illustration of FIG. 3. These elements are typically formed to control flow of coolant from the coolant manifold in the stack to and through each bipolar plate. Presently, coolant headers 54 and 56 are provided with a minimum number of flow restrictors so that there is sufficient coolant flow for cooling the highest temperature regions of the fuel cell stack. If a different cooling rate is desired in unipolar plates or certain bipolar plates it is necessary to form different plates with additional coolant flow restrictors. This requires different tooling for these different plates. The object and advantage of this invention is to form such restrictions in using common stamping tooling for all of the anode and cathode plates making up the bipolar plates in a fuel cell stack.

Figure 4:
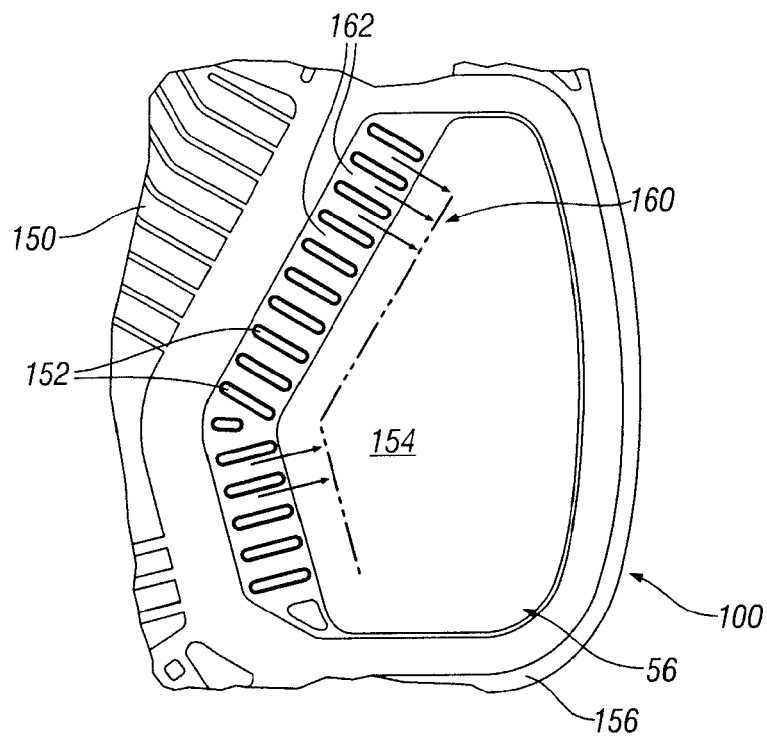
FIG. 4 is a plan view of a fragment of a stamped plate for a bipolar plate. This fragmental view is of the coolant exit header region of the plate and with specified coolant flow restriction features suitable for a separator plate in a high heat generation region of a fuel cell stack.

FIG. 4 is a fragmentary view of an anode plate showing the coolant outlet header 56, like that of anode sheet 100 in FIG. 1. The same outlet header features would exist in cathode sheet 200. FIG. 4 shows the top surface of the anode sheet 100 with anode flow field features 150 for directing anode gas to the anode outlet header which is not shown in this view. In a bipolar plate, anode sheet 100 would overlie a suitably oriented, identical sheet serving as a cathode sheet (not visible in this view). Here, anode sheet 100 has been stamped to contain coolant flow restrictors 152 depressed from its top side (in this view) at the outlet coolant header 56. Coolant flow restrictors 152 on the anode plate 100 would contact like restrictors formed on the back side of a facing cathode plate for controlling the flow of coolant into the trimmed away and opened manifold portion 154 of the anode plate 100. Directional arrows between coolant flow restrictors 152 show the flow direction and paths of coolant flow entering the opened manifold section 154. The phantom line 160 at the heads of the directional arrows in FIG. 4 represents a flow front of the coolant stream through channels 162 between restrictors 152 and into the manifold 154. The outer edge 156 of anode plate 100 is suitably bonded to an underlying like edge of the cathode plate. So coolant exits from the coolant flow fields between anode plate 100 and an underlying cathode plate through channels 162 around flow restrictors 152 and into the open manifold portion 154 provided in the bipolar plate stack.

The coolant flow field including flow restrictors 152 in coolant outlet header 56 provides suitable coolant flow for the high temperature regions in the middle of the stack. Like, or different, coolant flow restrictors may be formed in the coolant inlet headers 54 (FIGS. 1, 2, and 3). However, for unipolar end plates and for bipolar plates toward the ends of the stack it is often desired to have a lower coolant flow rate because those portions of the stack do not normally require as much cooling. Accordingly, this invention provides that additional flow restrictor features be formed during the stamping of the metal sheet. An illustration of such additional coolant flow restrictors is provided in FIG. 5.

Figure 5:
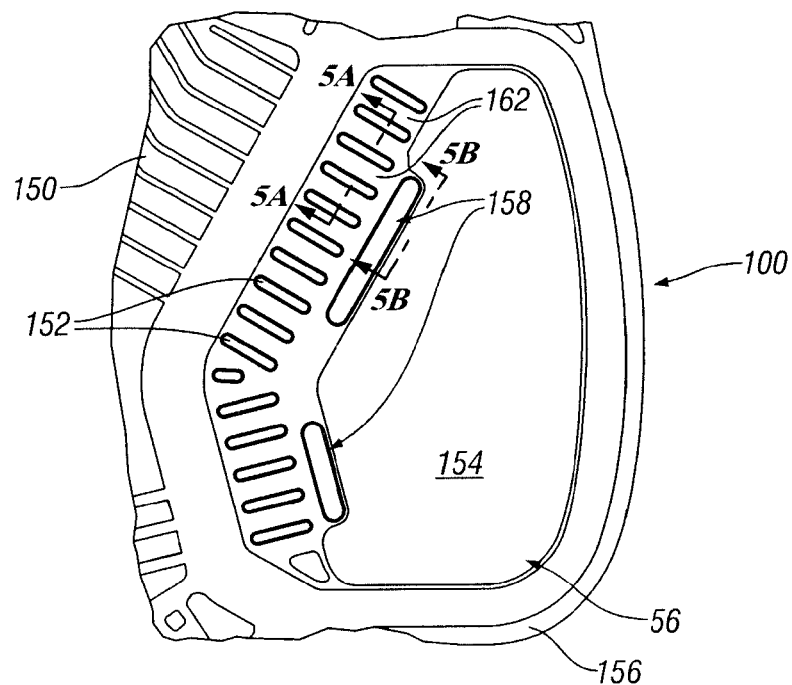
FIG. 5 is a plan view (with sections 5A-5A and 5B-5B) of a fragment of a stamped plate for a bipolar plate. This fragmental view is of the coolant exit header region of the plate and showing added coolant flow restriction features suitable for a separator plate in a lower temperature operating region of a fuel cell stack. Section 5A-5A is presented as FIG. 5A and section 5B-5B is presented as FIG. 5B.
Figure 5A:
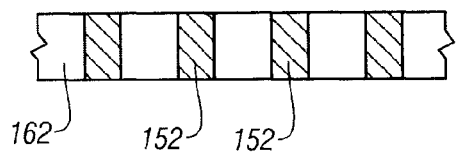
Figure 5B:
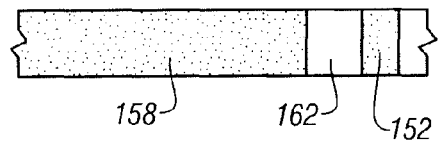

As seen in FIG. 5, additional sheet metal has been retained in the exit header 56 portion of stamped anode sheet 100 (and likewise in the underlying cathode sheet, not seen). Additional coolant flow restrictors 158 (two illustrated as an example) have been formed in the anode sheet 100 transverse to the coolant flow path into the open manifold region 154 of the bipolar plate. Section 5A-5A of FIG. 5 is taken through the original flow restrictors 152 and shows (in FIG. 5A) how the coolant flow path (the direction of the flow front 160 in FIG. 4) is restricted by flow restrictors 152. The coolant flows through channels 162 between restrictors 152 and then around restrictors 158. Similarly, section 5B-5B shows (in FIG. 5B) the substantial additional restriction to the flow path of coolant provided by flow restrictors 158 that have been added to each of the anode and cathode plates forming the bipolar plate. The size, shape, and orientation (preferably transverse to coolant flow) of these additional flow restrictors 158 is determined to provide suitable additional resistance to coolant flow. Thus, coolant flow is reduced so that the heat removal from the unipolar plates and bipolar plates in a lower temperature region of the stack is adequately reduced. In the practice of this invention, tooling is provided to form flow restrictors 158 on inlet and outlet header portions of all stamped plates for bipolar or unipolar plate assembly. Then, the flow restrictors are removed from plates intended for higher temperature regions of the stack at the same time that other trimming operations are performed on the sheet metal.

Figure 6:
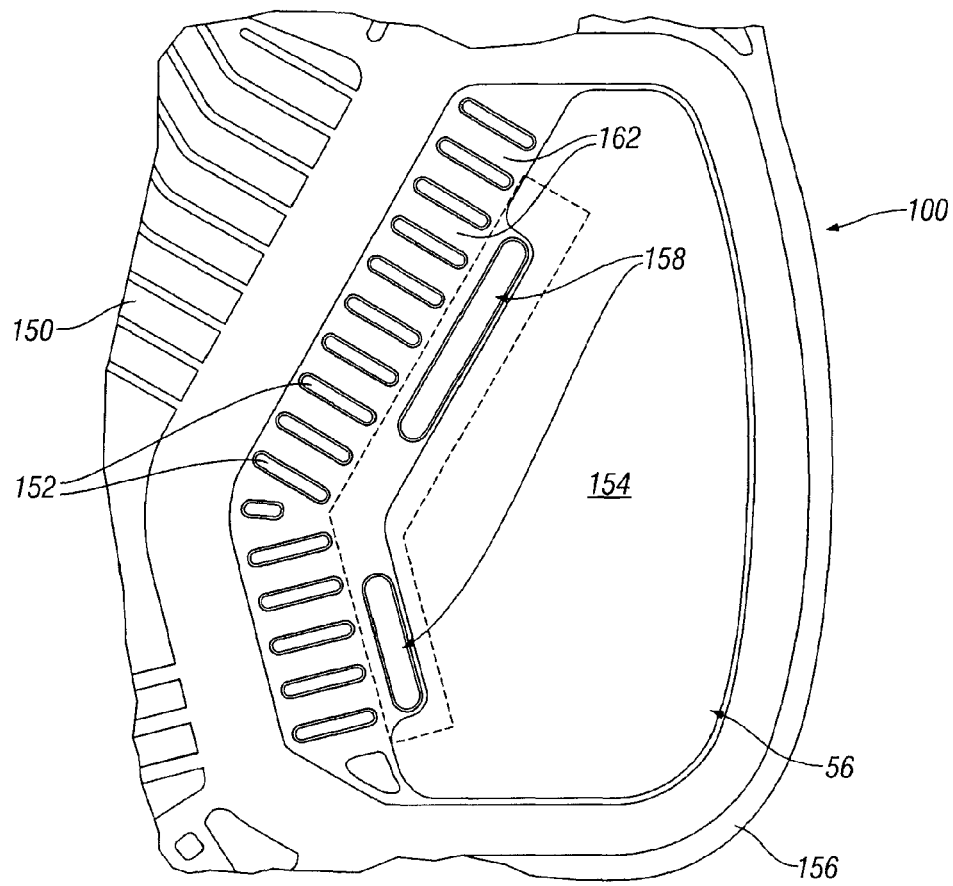
FIG. 6 is a plan view of a fragment of a stamped plate for a bipolar plate. This fragmental view is of the coolant exit header region of the plate and showing a stamped region with added coolant flow restriction features that may be trimmed from the stamping for selected plates requiring less restricted coolant flow. The region of the stamping that may be removed is within the dashed line.

FIG. 6 illustrates how the additional stamped coolant flow restrictors 158 can be removed by cutting or trimming metal within the dashed lines from the formed anode plate 100 when the plate is intended to be used in a bipolar plate where the higher coolant flow is required. Although the common tooling is used in stamping all plates, the additional features (like coolant flow restrictors 158) are simply trimmed out when the manifold region 154 is trimmed out from the respective anode and cathode plates.

In another embodiment of the invention, the sheet metal forming manifold 154 regions, including potential additional coolant flow restriction regions, can be trimmed from a sheet before the stamping operation is conducted. Then, during stamping there is no sheet material for the formation of the additional features 158.

While the invention has been described in terms of certain preferred embodiments it will be appreciated that other forms of the invention could readily adapted by those skilled in the art. Accordingly, the scope of the invention is not to be limited to the disclosed embodiments.

The invention claimed is:

1. A method of making a series of plate members for bipolar plates specified for a fuel cell comprising an assembled stack of a plurality of such bipolar plates; each bipolar plate comprising two such plate members, each of the two plate members having two opposite plate surfaces with gas flow passages formed on one surface and coolant flow passages formed on the other surface, the plate members being formed with a coolant inlet and a coolant outlet and being attachable with coolant flow surfaces in facing relationship to define coolant flow passages; the method comprising:

successively stamping a plate configuration in a metal sheet for a series of the plate members, each plate configuration containing a plurality of stamped coolant flow restricting elements at a coolant inlet and/or at a coolant outlet for adjusting coolant flow, the stamped coolant flow restricting elements being of a number and shape for limiting coolant flow to permit operation of a plate member intended for a bipolar plate to be located in the stack at a first coolant flow requirement; and, removing selected coolant flow restricting elements from those stampings for use in a selected plate member intended for a bipolar plate to be located in the stack at a second coolant flow requirement higher than the first coolant flow requirement.

2. A method of making a plate member for a bipolar plate as recited in claim 1 in which the selected coolant restriction flow elements are removed from just the coolant inlet.

3. A method of making a plate member for a bipolar plate as recited in claim 1 in which the selected coolant restriction flow elements are removed from the coolant inlet and the coolant outlet.

4. A method of making a series of plate members for bipolar plates specified for a fuel cell comprising an assembled stack of a plurality of such bipolar plates; each bipolar plate comprising two such plate members, each of the two plate members having two opposite plate surfaces with gas flow passages formed on one surface and coolant flow passages formed on the other surface, the plate members being formed with a coolant inlet and a coolant outlet and being attachable in a bipolar plate with coolant flow surfaces in facing relationship to define coolant flow passages; the method comprising:

providing tools for successively stamping a plate configuration in a metal sheet for a series of the plate members, where each plate configuration is to contain a plurality of stamped coolant flow restricting elements at a coolant inlet and at a coolant outlet for controlling coolant flow, the stamped coolant flow restricting elements being of a number and shape for limiting coolant flow to permit operation of a plate member intended for a bipolar plate to be located in the stack at a first coolant flow requirement;

successively stamping plate configurations in one or more metal sheets for a series of the plate members; and, either (a) removing selected coolant flow restricting elements from those stampings for use in a selected plate member intended for a bipolar plate to be located in the stack at a second coolant flow requirement higher than the first coolant flow requirement; or, prior to stamping (b) removing each portion of the metal sheet in which a selected coolant flow restricting element would be formed by such stamping step in a selected plate member intended for a bipolar plate to be located in the stack at a second coolant flow requirement higher than the first coolant flow requirement.

5. A method of making a series of plate members for bipolar plates as recited in claim 4(a) in which the coolant flow restricting element is removed from both the coolant inlet and outlet or from just the coolant inlet part of the stamping.

6. A method of making a series of plate members for bipolar plates as recited in claim 4(b) in which the portion of the metal sheet for coolant flow restricting element is removed from both the coolant inlet and outlet or from just the coolant inlet part of the stamping.

7. A method of making a series of sheet metal plate members for a fuel cell stack of bipolar plates, the method comprising:

providing tools for successively stamping a plate member configuration in a metal sheet for a series of the plate members, the tools being designed to form coolant flow restricting elements in the sheet for the lowest cooling requirements of a bipolar plate in the stack;

successively stamping plate configurations in one or more metal sheets for a series of the plate members; and, either (a) removing selected coolant flow restricting elements from those stampings for use in a selected plate member intended for a bipolar plate to be located in the stack at a second coolant flow requirement higher than the lowest coolant flow requirement; or, prior to stamping, (b) removing each portion of the metal sheet in which a selected coolant flow restricting element would be formed by such stamping step in a selected plate member intended for a bipolar plate to be located in the stack at a second coolant flow requirement higher than the lowest coolant flow requirement.

8. A method of making a series of plate members for bipolar plates as recited in claim 7(a) in which the coolant flow restricting element is removed from both the coolant inlet and outlet portions of the stamping or from just the coolant inlet portion.

9. A method of making a series of plate members for bipolar plates as recited in claim 7(b) in which the portion of the metal sheet for coolant flow restricting element is removed from both the coolant inlet and outlet portions of the stamping or from just the coolant inlet portion.

* * * * *